United States Patent
Berger et al.

(10) Patent No.: US 11,772,938 B2
(45) Date of Patent: Oct. 3, 2023

(54) SPEED MONITORING DEVICE OF A PASSENGER TRANSPORTATION SYSTEM

(71) Applicant: INVENTIO AG, Hergiswil (CH)

(72) Inventors: Michael Berger, Königstetten (AT); Dirk Mark Blondiau, Vienna (AT); Gerhard Stoiber, Zistersdorf (AT)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/777,950

(22) PCT Filed: Nov. 10, 2020

(86) PCT No.: PCT/EP2020/081669
§ 371 (c)(1),
(2) Date: May 18, 2022

(87) PCT Pub. No.: WO2021/099187
PCT Pub. Date: May 27, 2021

(65) Prior Publication Data
US 2022/0402729 A1    Dec. 22, 2022

(30) Foreign Application Priority Data
Nov. 18, 2019  (EP) .................................. 19209772

(51) Int. Cl.
*B66B 25/00*  (2006.01)
(52) U.S. Cl.
CPC .......... *B66B 25/006* (2013.01); *B66B 25/003* (2013.01)
(58) Field of Classification Search
CPC ............................ B66B 25/006; B66B 25/003
(Continued)

(56) References Cited

U.S. PATENT DOCUMENTS

| 2005/0173223 A1* | 8/2005 | Fargo | B66B 23/024 198/330 |
| 2012/0147187 A1* | 6/2012 | Li | G06V 20/58 348/148 |

FOREIGN PATENT DOCUMENTS

| CN | 201237602 Y | 5/2009 |
| CN | 202075295 U | 12/2011 |

(Continued)

OTHER PUBLICATIONS

Fei Tao et al. "Digital twin-driven product design, manufacturing and service with big data." The International Journal of Advanced Manufacturing Technology. London. vol. 94, No. 9-12, Mar. 16, 2017, pp. 3563-3576. ISSN:0268-3768, XP055547858. DOI: 10.1007/s00170-017-0233-1.

(Continued)

*Primary Examiner* — James R Bidwell
(74) *Attorney, Agent, or Firm* — Knobbe Martens Olson & LLP

(57) ABSTRACT

A speed monitoring device for measuring a rotational frequency or rotational speed of a main drive shaft of a passenger transportation system can include at least one rotational speed sensor having an input shaft, a pinion, and a tapping device arranged on a shaft casing surface of the main drive shaft of the passenger transportation system. Furthermore, there is also a bracket for attaching the rotational speed sensor and the pinion in a stationary position relative to an axis of rotation of the tapping device, the tapping device having a gearing which can be coupled to the pinion in a rotation-transmitting manner, and the pinion being rotatably mounted in the bracket at two bearing areas.

21 Claims, 5 Drawing Sheets

(58) Field of Classification Search
USPC .......................................................... 198/323
See application file for complete search history.

(56) References Cited

FOREIGN PATENT DOCUMENTS

| | | | | |
|---|---|---|---|---|
| CN | 205011213 U | 2/2016 | | |
| CN | 108226559 A | 6/2018 | | |
| CN | 108609472 A | 10/2018 | | |
| EP | 3026001 A1 | 6/2016 | | |
| EP | 3530606 A1 | 8/2019 | | |
| EP | 3760559 | * | 1/2021 | ............... B66B 1/34 |
| JP | 2007217090 | * | 8/2007 | ........... B66B 23/026 |
| JP | 2007217090 A | 8/2007 | | |

OTHER PUBLICATIONS

International Search Report for International Application No. PCT/EP2020/081669 dated Feb. 22, 2021.

* cited by examiner

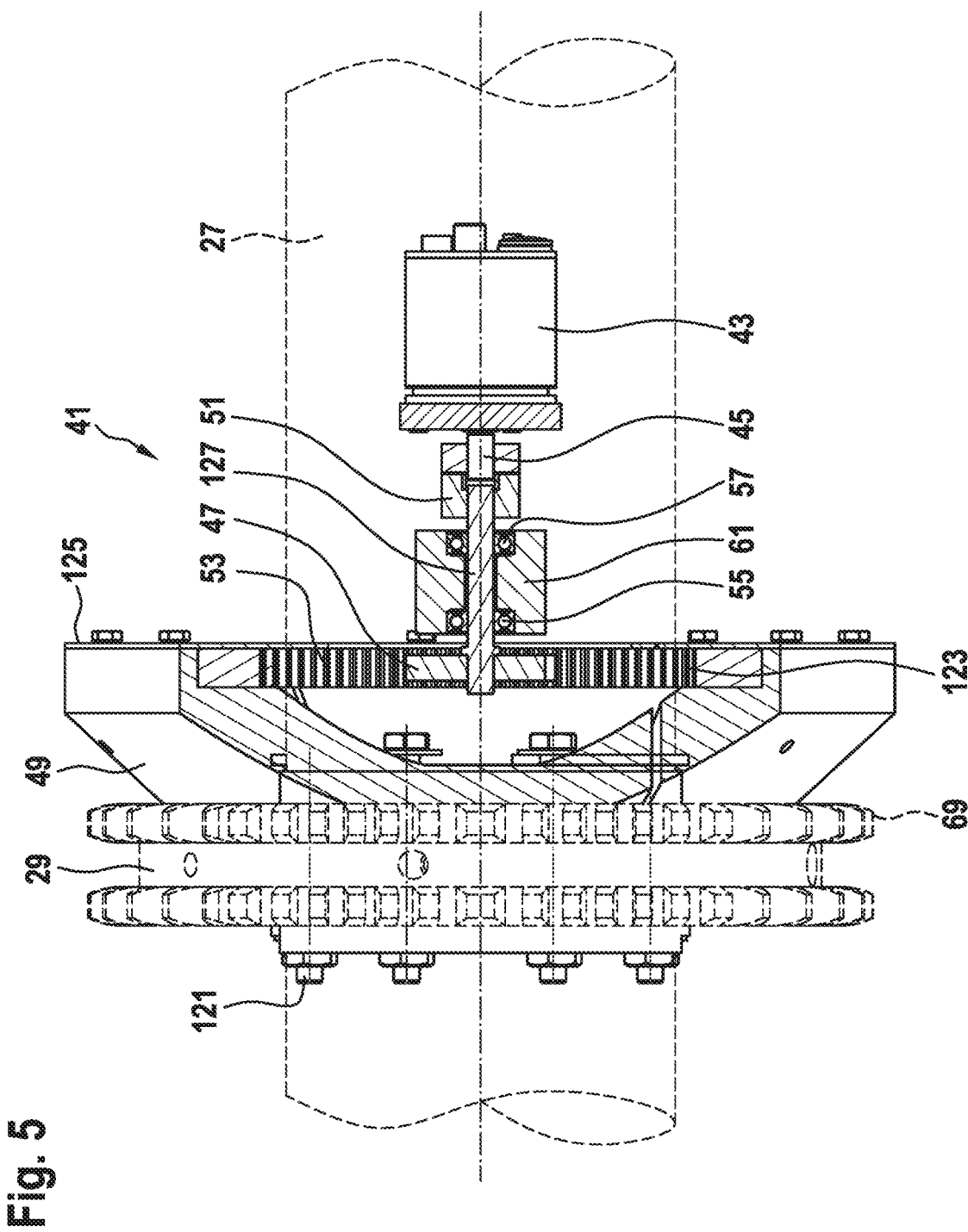

SPEED MONITORING DEVICE OF A PASSENGER TRANSPORTATION SYSTEM

TECHNICAL FIELD

The disclosure relates to a speed monitoring device for measuring a rotational frequency or a rotational speed of a main drive shaft of a passenger transportation system, and to a passenger transportation system having such a speed monitoring device.

SUMMARY

Such passenger transportation systems configured as escalators or moving walkways comprise a main drive shaft having at least one drive sprocket for driving and deflecting a conveyor belt. These are widely used and can be employed, for example, in public transport buildings such as train stations, airports, subway stations and the like. Furthermore, many of these systems can also be found in department stores, shopping malls, amusement parks, etc. Depending on the area of application and location, these passenger transportation systems are subject to different requirements, which are specified on the one hand by standards such as EN 115-1 and, on the other hand, by customer-specific requirements such as the conveying capacity and conveying height.

Because people are transported using escalators and moving walkways, escalators and moving walkways are subject to special safety regulations and must be built and constructed very safely. One way of increasing safety can be, for example, to prescribe safety factors with regard to the physical strength of safety-relevant components. Another possibility is to provide sensors in the escalator or in the moving walkway which can measure specific operating parameters. Their measuring signals are transmitted to the controller of the escalator or moving walkway and evaluated there with regard to possible dangers. In order to monitor the motions of the conveyor belt, which is designed as a step belt or pallet belt, of a passenger transportation system, its motions can be recorded by means of a speed monitoring device, and the recorded measurement signals can be transmitted to the controller.

The conveyor belt is arranged circumferentially in the passenger transportation system and is deflected between two deflection regions from a forward direction to a return direction. It is now possible, for example, to use a sensor to determine the passing steps or pallets and to measure their speed. Another option is to monitor the main drive shaft using sensors. Such a speed monitoring device is disclosed, for example, in EP 3 530 606 A1. This speed monitoring device has a tapping device that can be attached to the shaft casing surface of the main drive shaft. There is also a rotational speed sensor that has a friction wheel on its input shaft. When the main drive shaft rotates, it rotates the tapping device, and the motion of the tapping device is transmitted to the rotational speed sensor via the friction wheel.

The speed monitoring device of the aforementioned type has the disadvantage that the motions tapped by means of the friction wheel may be transmitted with errors. For example, the coefficient of friction between the friction wheel and the tapping device can be reduced by oil or other lubricants in such a way that very rapid motions and changes in speed of the main drive shaft are not transmitted precisely enough to the friction wheel. Another problem is that dirt deposits adhere to the surfaces during operation and, there, are hard-rolled on their surfaces by the two rotating friction partners. Such hard-rolled dirt deposits lead to a change in the diameter of the tapping device and/or to a change in the diameter of the friction wheel. As a result, the transmission ratio between these two parts can change, so that a change in speed that actually does not exist is detected, the evaluation of which can in some cases trigger an alarm signal.

Another possible arrangement of a speed monitoring device is disclosed in JP 2007 217090 A, in which an encoder is coupled to a shaft of a reduction gear.

An object of the present disclosure is therefore to specify a speed monitoring device which overcomes the disadvantages described above.

This object is achieved by a speed monitoring device for measuring a rotational frequency or rotational speed of a main drive shaft of a passenger transportation system. This speed monitoring device comprises at least one rotational speed sensor having an input shaft. Furthermore, the speed monitoring device comprises a tapping device which is configured in such a way that it can be arranged on a shaft casing surface of a main drive shaft of a passenger transportation system, the rotational frequency of which is to be measured. In addition, the speed monitoring device comprises a bracket for attaching the rotational speed sensor in a stationary position relative to an axis of rotation of the tapping device. Furthermore, the speed monitoring device has a pinion which is mechanically connected to the input shaft of the rotational speed sensor, so that a rotation of the pinion can be transmitted to the input shaft. In order for the rotational motion of the tapping device to be transmitted precisely, the tapping device has a gearing which can be coupled to the pinion in a positive-locking, rotation-transmitting manner. In order to protect the input shaft of the rotational speed sensor from undesired influences, the pinion is rotatably mounted in two bearing positions in the bracket. In the present document, the feature "pinion" is to be understood as meaning a wheel with gearing, in particular a gearwheel or a sprocket.

Rotational speed sensors such as rotary encoders, angle encoders, encoders, etc. are highly precise and therefore also very sensitive sensors. In particular, the rotational speed sensor has a bearing on the input shaft that is sensitive to impacts and excessive forces. Such forces can be caused, for example, by foreign bodies that get between the gearing of the pinion and the tapping device. Due to the tooth geometry, there are also radial forces on the pinion which, if the pinion were arranged directly on the input shaft, would lead to increasing loads on the input shaft bearing and would significantly reduce its service life. In other words, the bearing of the pinion in bearing areas on both sides thus ensures that, apart from the rotational motion, no other forces and moments act on the input shaft of the rotational speed sensor. This means that by mounting the pinion in two bearing areas, the input shaft can be completely decoupled from impacts and excessive forces, in particular also from bending moments. As a result, the service life of the rotational speed sensor and thus also the reliability of the system can be increased.

In accordance with the disclosure, the tapping device is configured to be attached to a side flank of a shaft shoulder of the main drive shaft. This allows the tapping device to be attached easily and securely and prevents the tapping device from being able to shift relative to the main drive shaft. Such a shaft shoulder can be, for example, a handrail drive sprocket that is formed on the main drive shaft or attached thereto, via which sprocket a handrail drive of the passenger transportation system can be driven. Screws, for example, can be used for the attachment which are arranged parallel to the axis of rotation of the main drive shaft and are arranged penetrating the handrail drive sprocket and ring halves of the split adapter.

In one embodiment of the disclosure, the rotation-transmitting coupling is effected by direct engagement of the pinion in the gearing of the tapping device. In other words, the gearing of the pinion engages directly with the gearing of the tapping device. Because the pinion is rotatably mounted in two bearing areas, the flank forces arising from the direct engagement of the pinion in the gearing of the tapping device are excellently supported in the bearing areas. This means that these forces are not transferred to the input shaft of the rotational speed sensor.

In a further embodiment, the rotation-transmitting coupling between the pinion and the gearing is effected via a positive-locking transmission element such as a chain, a timing belt or an intermediate gear. The positive-locking transmission element is matched to the gearing of the pinion and the tapping device and, due to its design, it is logically able to transmit the rotational motion of the tapping device to the pinion. This arrangement allows the pinion and the rotational speed sensor connected thereto and transmitting rotation to be arranged at a greater distance from the main drive shaft. Such an arrangement is necessary when the spatial conditions between the conveyor belt do not allow direct engagement of the pinion in the gearing of the tapping device. The tensile forces of the chain or the timing belt acting on the pinion are transmitted to the bracket through the two bearing areas and do not act on the input shaft of the rotational speed sensor.

In a further embodiment of the disclosure, a torsionally rigid, flexible clutch can be provided between the pinion and the input shaft. This can compensate for angular error and offset between the central longitudinal axis of the input shaft and the central longitudinal axis of the pinion. This torsionally rigid flexible clutch is preferably made of metal. Possible types of clutches are claw clutches, denture clutches, metal bellows clutches, spring clutches and the like.

In a further embodiment of the present disclosure, the tapping device can comprise an annular, split adapter. In this case, the gearing is arranged on an annular outer surface of the tapping device. Because the adapter is split, it can be attached to the main drive shaft without disassembling said shaft.

In an alternative embodiment, the tapping device of the speed monitoring device can comprise an annular, split adapter, the gearing being arranged on an inner surface of the tapping device. Because the tapping device is arranged below the front end of the circulating conveyor belt, it is exposed to falling dirt. Thanks to the internal gearing, a high level of protection against the accumulation of this dirt in the gearing can be achieved.

In order to be able to position the pinion precisely with respect to the tapping device, the bracket is preferably made in at least two parts, including a first bracket part and a second bracket part. The two bearing areas in which the pinion is rotatably mounted can be formed on the first bracket part. Furthermore, the rotational speed sensor can also be arranged on the first bracket part. For example, an attachment region can be formed on the second bracket part which is provided for attaching the bracket to a fixed structural part of the passenger transportation system. The first bracket part and the second bracket part are adjustably connected to one another via a connection area.

Furthermore, the speed monitoring device can include a protective housing, which can be attached to the bracket.

The protective housing can cover the pinion and the rotational speed sensor. As a result, the protective housing of a hood acts in the same way against falling dirt. In a further embodiment, the protective housing can also cover the pinion, the rotational speed sensor and the tapping device. This hood-shaped protective housing thus also protects the engagement between the pinion and the tapping device and thereby prevents damage to the gearing of the pinion and tapping device from falling hard objects. In a further embodiment, the protective housing can also enclose the pinion, the rotational speed sensor and the tapping device. In this case, the protective housing is preferably made in two parts, so that it can be assembled or disassembled even if the main drive shaft is installed in the passenger transportation system. The said protective housing thus protects the entire speed monitoring device on all sides, so that an optimal segregation from environmental influences is possible. If necessary, a heater can also be integrated in the protective housing in order to prevent the formation of condensation within the protective housing.

In order to install the speed monitoring device in a passenger transportation system, which is configured as an escalator or moving walkway, its tapping device can be attached to a shaft casing surface of a main drive shaft of the passenger transportation system. A further speed monitoring device assembly, which comprises at least the bracket, a rotational speed sensor and the pinion of the speed monitoring device, can be fixedly attached to a structural part of a supporting structure of the passenger transportation system. The main drive shaft of the passenger transportation system is also rotatably mounted in this supporting structure.

It is clear from the above description that the speed monitoring device can be installed not only during the assembly of the passenger transportation system in the manufacturer's factory. Due to the annular, two-part adapter, existing passenger transportation systems installed in buildings can also be retrofitted with a speed monitoring device of the aforementioned type. In addition, this refinement facilitates the maintenance of the speed monitoring device.

The passenger transportation system can have a control device and/or a signal transmission device for an external data processing device. The signals generated by the rotational speed sensor can be transmitted to the control device and/or the signal transmission device continuously or at discrete time intervals. These signals can be compared to limit values for permissible acceleration and deceleration values, maximum permissible speeds of the conveyor belt and the like, and, if any of these limit values is exceeded, an alarm signal can be output which triggers an appropriate action by the control device, such as an emergency stop of the conveyor belt.

Furthermore, parallel to the physically existing passenger transportation system, a digital twin data record can be present that virtually depicts this passenger transportation system. The signals generated here by the rotational speed sensor can be transmitted to the digital twin data record via the signal transmission device. By processing these signals in connection with the data of the digital twin data record, dynamic processes of the operational passenger transportation system can be simulated and displayed in real time on the digital twin data record.

The digital twin data record comprises the characterizing properties of components of the physical passenger transportation system in a machine-processable manner. This digital twin data set consists of component model data sets comprising data which were determined by measuring characterizing properties on the physical passenger transportation system after assembly and installation thereof in a building.

The characterizing properties of the physical components can be the geometric dimensions of the component, the weight of the component and/or the surface quality of the component. Geometric dimensions of the components can be, for example, a length, a width, a height, a cross section, radii, fillets, etc. of the components. The surface quality of the components can include, for example, roughnesses, textures, coatings, colors, reflectivities, etc. of the components. The characterizing properties can also be dynamic information, for example a motion vector of a component model data record which indicates its direction of motion and speed relative to surrounding component model data records or to a static reference point of the digital twin data record.

The characterizing properties can relate to individual components or component groups. For example, the characterizing properties can relate to individual components from which larger, more complex component groups are assembled. Alternatively or additionally, the properties can also relate to more complex equipment assembled from a plurality of components, such as drive motors, gear units, conveyor chains, etc.

The signals from the rotational speed sensor are transmitted as measurement data to the digital twin data record and, using a set of rules, characterizing properties of the component model data records affected by the transmitted measurement data are redetermined. The characterizing properties of the affected component model data sets are then updated with the redetermined, characterizing properties. Specifically, for example, the rotational frequency measured by the rotational speed sensor can be transferred to the component model data set representing the main drive shaft and to the component model data sets forming the conveyor belt. In this way, for example, in the case of the digital twin data record reproduced on a screen as a virtual representation, all dynamically movable component model data records can be displayed with the same speed as their physical components in the physical passenger transportation system at the instant the signals are recorded. The interactions of the component model data sets can be simulated from the motions of the component model data sets, and the forces acting on the components can be determined using the appropriate, known calculation programs from the fields of physics, mechanics and strength of materials.

After this, by means of the monitoring, changes and change trends in the updated characterizing properties of the traveling conveyor belt and their influence on the components of the conveyor belt and on the components interacting with these components can be tracked and evaluated by means of the digital twin data record by calculations and/or by static and dynamic simulations. Of course, evaluations with regard to dynamic processes that exceed limit values are also possible on the digital twin data record, as explained above in connection with the control device.

The present disclosure also includes a method for installing a speed monitoring device of the aforementioned type in a passenger transportation system that is configured as an escalator or moving walkway. In this case, the tapping device is attached to a shaft casing surface of a main drive shaft of the passenger transportation system. In a further step, an assembly of the speed monitoring device can be fixedly attached adjacent to the main drive shaft on a structural part of the supporting structure of the passenger transportation system, in which supporting structure the main drive shaft is also rotatably mounted. This assembly includes at least the bracket, a rotational speed sensor and the pinion of the speed monitoring device.

It should be noted that some of the possible features and advantages of the disclosure are described herein with reference to different embodiments. A person skilled in the art will recognize that the features can be suitably combined, adapted or replaced in order to arrive at further embodiments of the disclosure.

BRIEF DESCRIPTION OF THE DRAWINGS

Embodiments of the disclosure will be described below with reference to the accompanying drawings, with neither the drawings nor the description being intended to be interpreted as limiting the disclosure.

FIG. 5 shows details of the speed monitoring device shown in FIG. 4 in a sectional view.

The drawings are merely schematic and not true to scale. Like reference signs denote like or equivalent features in the various drawings.

DETAILED DESCRIPTION

Figure 1:
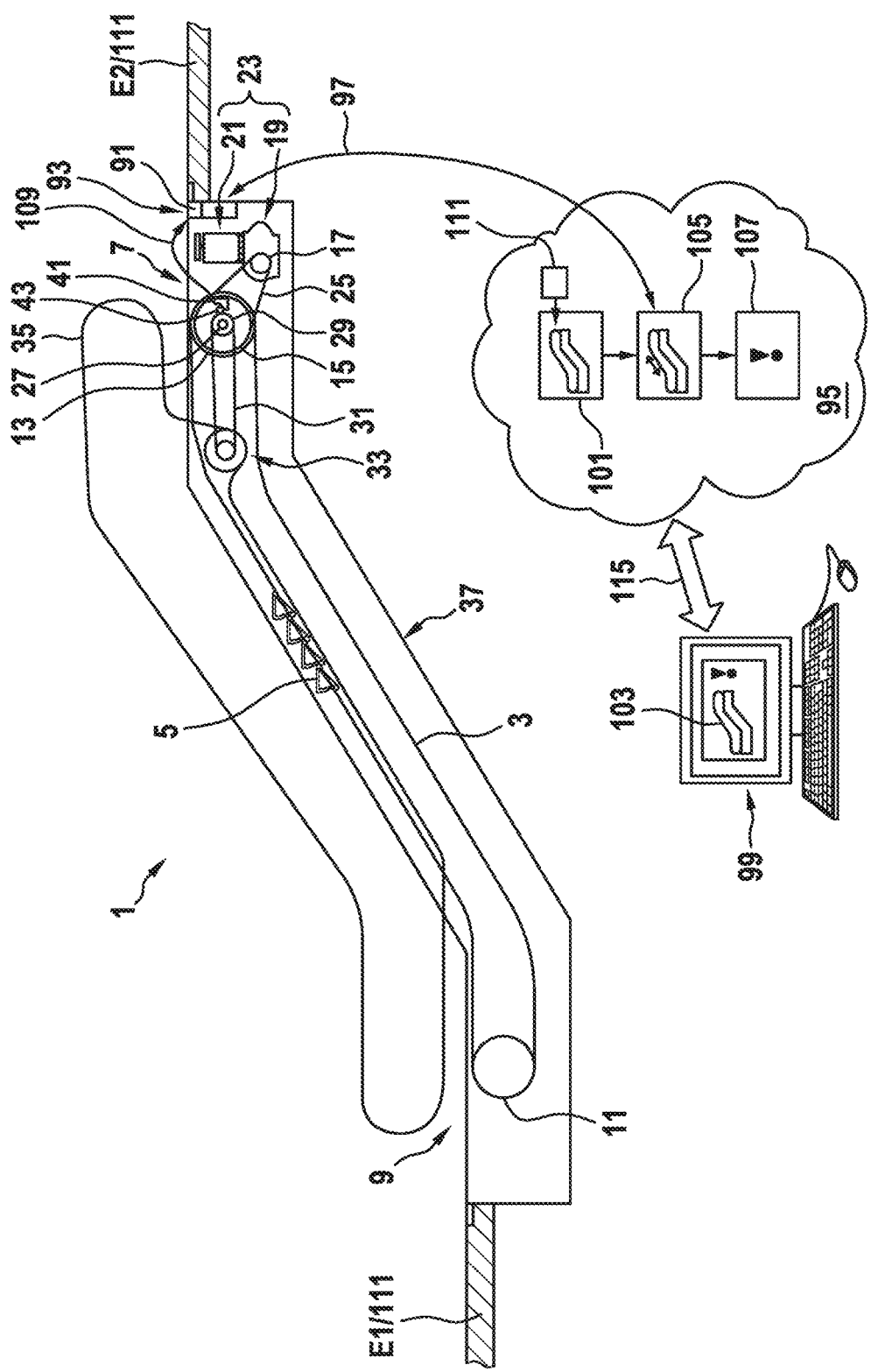
FIG. 1 schematically shows an overview of the most important components or modules of an escalator.

FIG. 1 shows a passenger transportation system 1, which is configured as an escalator. Here, only the most important components of the passenger transportation system 1 are shown schematically.

The passenger transportation system 1 connects a first floor E1 of a building 111 to a second floor E2 of this building 111. For this purpose, the passenger transportation system 1 has a supporting structure 37 which is supported on the two floors E1, E2 in the building 111. The supporting structure 37 is configured to be stable and load-bearing, so that it can support the weight against the building 111 of the other components of the passenger transportation system 1 and the users to be transported and their objects.

A conveyor belt 3 is arranged circumferentially in the supporting structure 37 between a first deflection region 9 and a second deflection region 7. The conveyor belt 3 has steps 5 on which users can stand. For the deflection, a deflection wheel 11 is arranged in the deflection region 9 on the first floor E1. On the second floor E2, a drive wheel 13 is arranged in the deflection region 7 and serves, not only to deflect the conveyor belt 3, but to drive it as well. For this purpose, the drive wheel 13 is attached to a main drive shaft 27 in a rotation-transmitting manner. Furthermore, a drive sprocket 15 is arranged on the main drive shaft 27. The drive sprocket 15 is operatively connected to a drive pinion 17 via a drive chain 25. The drive pinion 17 is driven by a motor 21 wherein its rotational motions are reduced via a gear 19 and transmitted to the pinion 17. The motor 21 and the gear 19 together form a drive unit 23.

The passenger transportation system 1 also has a handrail 35, which is likewise arranged circumferentially. In order to drive this, the passenger transportation system 1 has a handrail drive 33. The handrail drive 33 is operatively connected via a handrail drive chain 31 to a handrail drive sprocket 29, which handrail drive sprocket 29 is also arranged on the main drive shaft 27 in a rotation-transmitting manner. This configuration means that the motion of the handrail 35 is synchronized with the motion of the conveyor belt 3 or with its steps 5.

In order to determine the speed of the conveyor belt 3 or the handrail 35, a speed monitoring device 41 is provided which can determine the rotational frequency or the rotational speed of the main drive shaft 27. As symbolically represented by arrow 109, the signals generated by the speed monitoring device 41 which reflect the rotational frequency or rotational speed of main drive shaft 27 can be transmitted to a signal transmission device 91 and/or to a control device 93 of passenger transportation system 1. The signals from the speed monitoring device 41 can be evaluated in a suitable manner in the control device 93. Here, for example, these signals can be compared to the motor control data and motor signals of the motor 21, so that the conveyor belt 3 of the passenger transportation system 1 is fixed in the event of deviations that exceed a certain tolerance.

FIG. 1 shows a further possibility of evaluating the signals from the speed monitoring device 41 or from its rotational speed sensor 43. For this purpose, a digital twin data record 101 is used, which is stored, for example, in a data processing device 95 (cloud). This digital twin data record 101 maps the passenger transportation system 1 virtually. This means that each individual component of the passenger transportation system 1 is also reproduced in the digital twin data record 101. The digital twin data record 101 is preferably structured in component model data records 113, which are linked to one another via interface information. In other words, the components of the passenger transportation system 1 are reproduced as component model data sets 113. Each of these component model data sets has all the characterizing properties of the physical component to be depicted as completely as possible. Furthermore, the interface information present in the digital twin data record 101 reproduces there the arrangement of the components, their interaction with one another during the action and transmission of forces, moments and the like, and possibly their degrees of freedom of motion with respect to one another.

This digital twin data record 101 can, for example, be downloaded from the data processing device 95 via an input/output interface 99, a personal computer in the example shown, processed further and used for simulations 105. Of course, the simulations 105 can also be carried out in the data processing device 95, the input/output interface 99 then only being able to function as a computer terminal.

In order to be able to carry out the simulations 105, there is, as shown for example by the double arrow 97, the option of transmitting the signals of the rotational speed sensor 43 of the speed monitoring device 41 to the digital twin data record 101 via the signal transmission device 91. Supplemented in this way, this can be used to carry out the simulations 105 by examining how the signals of the speed monitoring device 41 affect the individual virtual components of the digital twin data record 101 represented by component model data records 113.

During the entire implementation of the simulation 105, the input/output interface 99 is in communication with the data processing device 95, as shown by the double arrow 115. Accordingly, the simulation 105 and the simulation results 107 can be displayed as a virtual representation 103 on the input/output interface 99. In this way, processes that occur when the passenger transportation system 1 is in operation can be represented in real time on the input/output interface 99 in an evaluated form.

Figure 2:
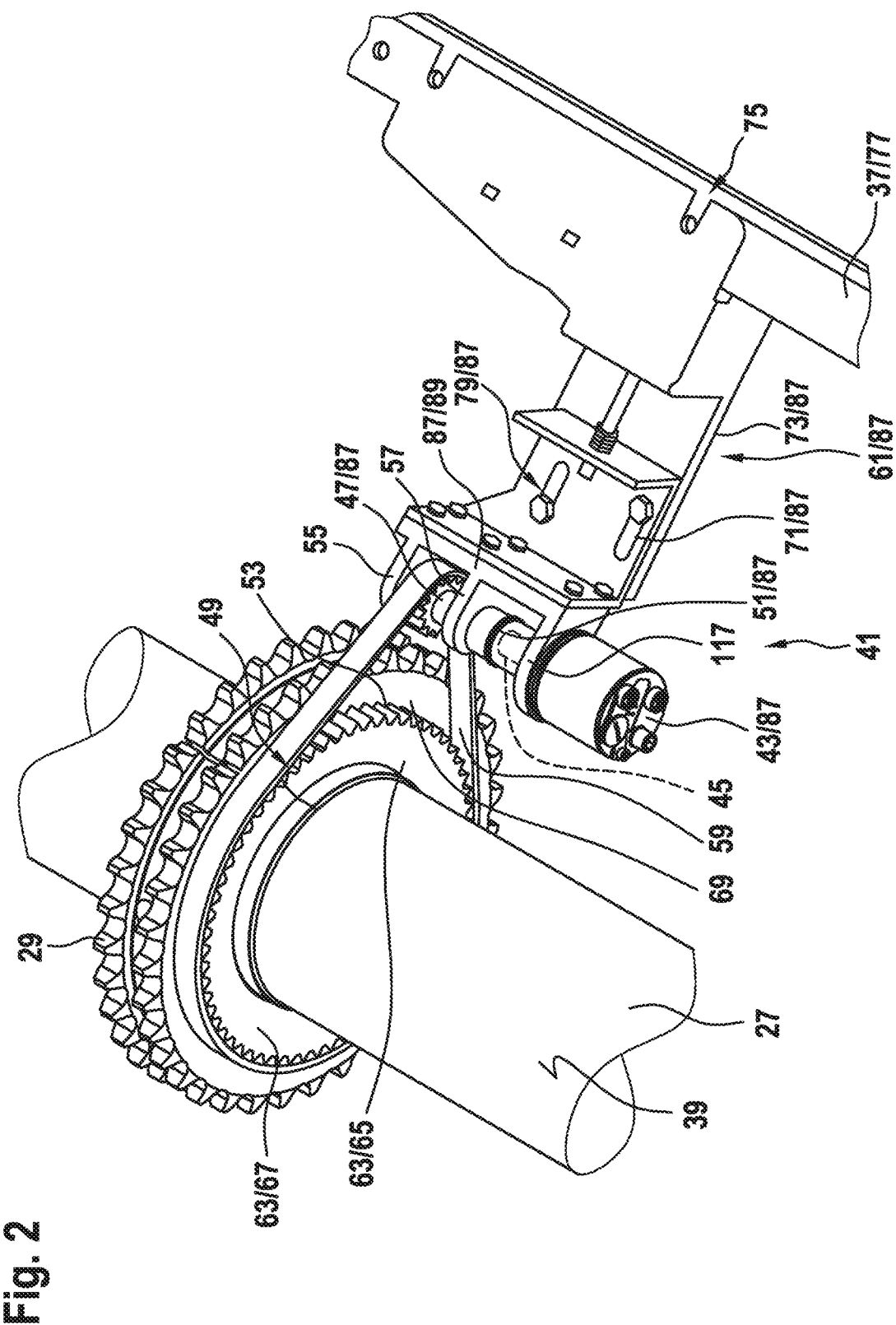
FIG. 2 shows a three-dimensional view of a portion of the main drive shaft from FIG. 1, as well as a first possible embodiment and arrangement of the speed monitoring device.

A first possible embodiment of the speed monitoring device 41 is shown in FIG. 2. For the sake of a better overview, FIG. 2 only shows a structural part 77 and a part of the main drive shaft 27 of the passenger transportation system 1. The structural part 77 of the present embodiment is part of the supporting structure 37 shown in FIG. 1.

The main drive shaft 27 has a shaft casing surface 39. The handrail drive sprocket 29 which is also shown in FIG. 1 is attached to this shaft casing surface 39. Directly adjacent to the handrail drive sprocket 29, a tapping device 49 is arranged on the main drive shaft 27 or on its shaft casing surface 39. The tapping device 49 can comprise an annular, split adapter 63 which has a first ring half 65 and a second ring half 67. With this design, the tapping device 49 can be attached to the shaft casing surface 39 even if the main drive shaft 27 is installed in the passenger transportation system 1. Preferably, the first half ring 65 and the second half ring 67 are attached to a side flank 69 of the handrail drive sprocket 29. This can be done, for example, by means of screws. However, it is also possible for the first ring half 65 and the second ring half 67 to be screwed together by providing screws that connect the two ring halves 65, 67 to one another, so that the inner ring surfaces of the annular, split adapter 63 are clamped to the shaft casing surface 39. The tapping device 49 also has a gearing 53 which is formed on the outer ring surfaces of the first ring half 65 and the second ring half 67.

The speed monitoring device 41 also includes a rotational speed sensor 43, a pinion 47, a clutch 51 and a bracket 61, which together form an assembly 87. In order to ensure a certain ability to set and adjust the pinion 47 relative to the tapping device 49, the bracket 61 is designed in two parts and thus has a first bracket part 71 and a second bracket part 73. The second bracket part 73 can be connected to the structural part 77 via an attachment region 75. The first bracket part 71 is connected to the second bracket part 73 by a connection area 79 so as to be adjustable relative to said second bracket part.

The first bracket part 71 also has a bearing block 89 with two bearing areas 55, 57 in which the pinion 47 is rotatably mounted. A receiving flange 117 is also formed on the bearing block 89, via which the rotary sensor 43 can be connected to the first bracket part 71. In order to protect the input shaft 45 of the rotational speed sensor 43 from bending loads, the input shaft 45 is connected to the pinion 47 via a torsionally rigid, flexible clutch 51 in a rotation-transmitting manner. The pinion 47 is connected to the gearing 53 of the tapping device 49 in a rotation-transmitting manner by means of a positive-locking transmission element 59. In the present embodiment, the positive-locking transmission element 59 can be a chain or a timing belt. For the sake of a better overview, the transmission element 59 is shown only schematically in FIG. 2, without a tooth profile or chain links. Of course, an intermediate gear wheel could also be used instead of a chain or a timing belt.

Figure 3:
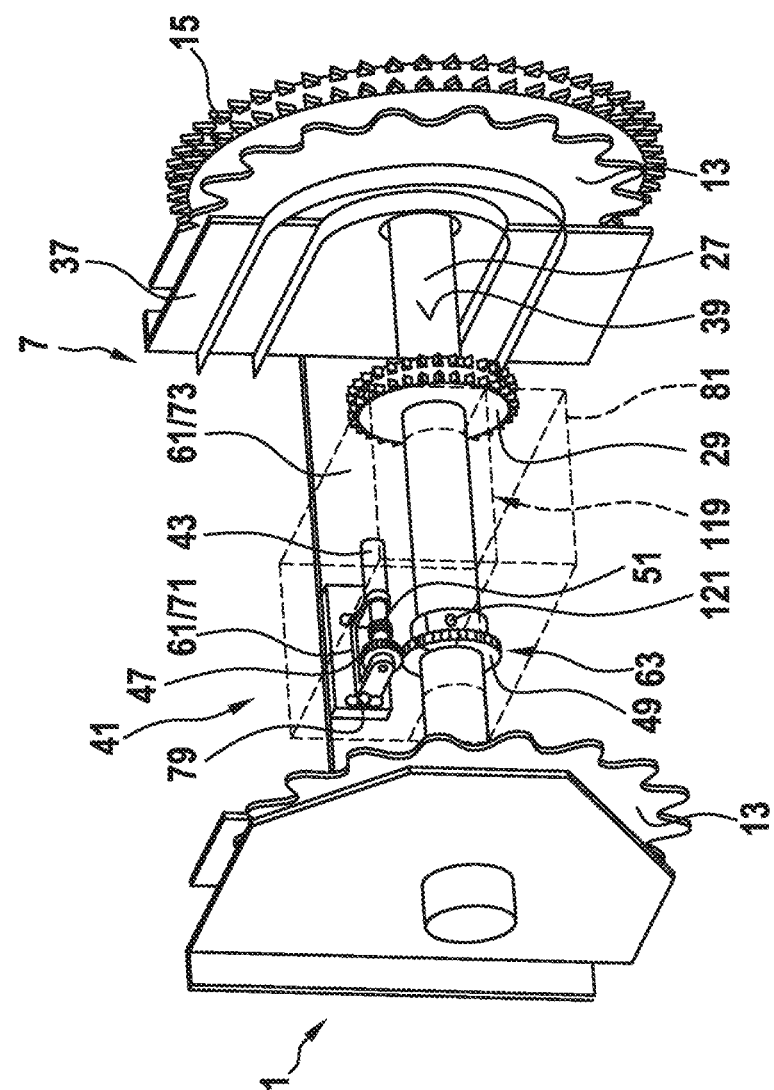
FIG. 3 shows the main drive shaft from FIG. 1 in a three-dimensional view, as well as a second possible embodiment and arrangement of the speed monitoring device.

FIG. 3 shows some of the components that are arranged in the deflection region 7 of the passenger transportation system 1. In particular, a portion of the supporting structure 37 is shown as well as the main drive shaft 27, to which the drive sprocket 15, two drive wheels 13 and the handrail drive sprocket 29 are attached. FIG. 3 also shows a further embodiment of the speed monitoring device 41.

The speed monitoring device 41 shown in FIG. 3 has the same components as shown in the previous embodiment in FIG. 2. This is in particular the rotational speed sensor 43, the torsionally rigid flexible clutch 51 and the pinion 47, which are arranged in the manner already described in the first bracket part 71 of the bracket 61. The first bracket part 71 is connected to the second bracket part 73 of the bracket 61 via the adjustable connection area 79. The second bracket part 73 is in turn fixedly attached to the supporting structure 37.

As in the embodiment in FIG. 2, the speed monitoring device 41 shown in FIG. 3 has a tapping device 49, which has an annular, split adapter 63. Instead of an integrally formed shaft shoulder, this is screwed to the shaft casing surface 39 of the main drive shaft 27 by means of screws 121. Unlike in FIG. 2, the rotation-transmitting coupling is effected via direct engagement of the pinion 47 in the gearing of the tapping device 63. In this way, another element such as a chain or a timing belt can be avoided. A protective housing 81 can be provided in order to protect the speed monitoring device 41 from environmental influences and in particular from dirt. The protective housing 81, shown with a broken line, encloses the entire speed monitoring device 41 and a part of the main drive shaft 27 penetrating this protective housing 81. In order to be able to install the protective housing 81, it is designed in two parts and can be separated at the indicated separation area 119. The protective housing 81 is preferably also attached to the first bracket part 71 or the second bracket part 73. Of course, the protective housing 81 does not have to have an enclosing configuration. The protective housing 81 can also only cover parts of the speed monitoring device 41. Such a protective housing 81 would, for example, only include the upper part of the depicted protective housing 81.

Figure 4:
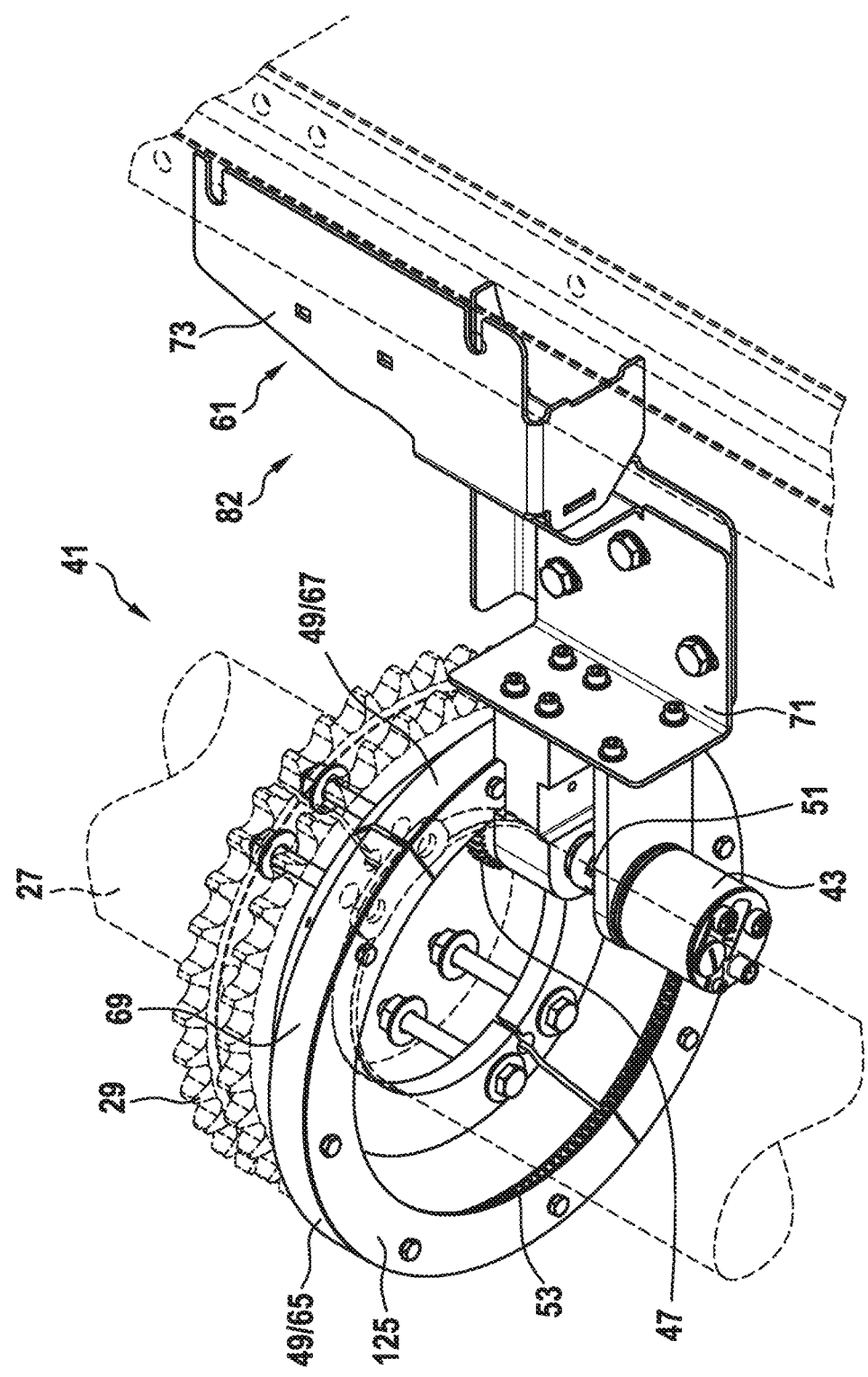
FIG. 4 shows a three-dimensional view of a portion of the main drive shaft from FIG. 1, as well as a third possible embodiment and arrangement of the speed monitoring device.

FIGS. 4 and 5 both show a further embodiment of the disclosure and are therefore described together below. As already described in connection with FIG. 3, the pinion 47 can be in direct engagement with the gearing 53 of the tapping device 49. In order to highlight the tapping device 49 of the speed monitoring device 41 more clearly, the main drive shaft 27 and the handrail drive sprocket 29 firmly connected thereto have been shown in broken lines.

The tapping device 49 is also in two parts and has a first ring half 65 and a second ring half 67. On an annular inner surface 123 formed by the two ring halves 65, 67, gearing 53 is formed in which the pinion 47 can engage and the rotational motion of the tapping device 49 can be tapped. The two ring halves 65, 67 are attached to a side flank 69 of the handrail chain wheel 29 by means of mounting screws 121. Due to the gearing 53 formed on the inside, the most sensitive part is already well protected from dirt. In order to improve protection, an annular dirt deflector 125 can also be provided.

In the embodiment in FIGS. 4 and 5, the speed monitoring device 41 also has an assembly 87 which includes a bracket 61 with a first bracket part 71 and a second bracket part 72, a rotational speed sensor 43, the pinion 47 and a torsionally rigid clutch 51. As can be clearly seen from FIG. 5, the two bearing areas 55, 57 are arranged between the pinion 47 and the torsionally rigid clutch 51. As a result, the bending moments on the pinion shaft 127 of the pinion 47 are also supported via the bracket 61, and the rotational speed sensor 43 is thereby relieved from them.

Although the disclosure has been described by showing specific embodiments, it is obvious that numerous further embodiments can be provided with the knowledge of the present disclosure, for example by an additional speed sensor 43 being brought into engagement with the tapping device 49 in a rotation-transmitting manner for reasons of redundancy.

The invention claimed is:

1. A speed monitoring device for measuring a rotational frequency or rotational speed of a main drive shaft of a passenger transportation system, the speed monitoring device comprising:
    at least one rotational speed sensor having an input shaft;
    a tapping device configured such that it can be arranged on a shaft casing surface of the main drive shaft of the passenger transportation system, the rotational frequency of which is to be measured; and
    a bracket for fixedly attaching the rotational speed sensor relative to an axis of rotation of the tapping device,
    the speed monitoring device further comprising a pinion which is mechanically connected to the input shaft so that a rotation of the pinion is transmitted to the input shaft;
    the tapping device having a gearing which can be coupled to the pinion in a rotation-transmitting manner; and
    the pinion being rotatably mounted in the bracket at two bearing areas;
    wherein the tapping device is configured to be attached to a side flank of a shaft shoulder of the main drive shaft; and
    wherein a torsionally rigid, flexible clutch is provided between the pinion and the input shaft.

2. The speed monitoring device of claim 1, wherein the rotation-transmitting coupling is effected by direct engagement of the pinion in the gearing of the tapping device.

3. The speed monitoring device of claim 1, wherein the rotation-transmitting coupling between the pinion and the gearing is effected via a positive-locking transmission element.

4. The speed monitoring device of claim 1, wherein the tapping device comprises an annular, split adapter and wherein the gearing is arranged on an outer surface of the tapping device.

5. The speed monitoring device of claim 1, wherein the tapping device comprises an annular, split adapter and wherein the gearing is arranged on an inner surface of the tapping device.

6. The speed monitoring device of claim 1, wherein the bracket comprises at least two parts, wherein the rotational speed sensor is arranged on a first bracket part of the bracket and the pinion is rotatably mounted at the bearing areas, wherein a second bracket part of the bracket has an attachment region, which is provided for attaching the bracket to a fixed structural part of the passenger transportation system, and wherein the first bracket part and the second bracket part are adjustably connected to one another via a connection area.

7. The speed monitoring device of claim 1, further comprising a protective housing which can be attached to the bracket and the protective housing covers the pinion, the rotational speed sensor and the tapping device.

8. The speed monitoring device of claim 1, further comprising a protective housing which can be attached to the bracket and encloses the pinion, the rotational speed sensor and tapping device.

9. A method for installing the speed monitoring device of claim 1 in a passenger transportation system, which is configured as an escalator or moving walkway, the method comprising:

attaching the tapping device is attached to a side flank of a shaft shoulder of a main drive shaft of the passenger transportation system, and wherein an assembly on a structural part of a supporting structure of the passenger transportation system, in which supporting structure the main drive shaft is also rotatably mounted, is fixedly attached adjacent to the main drive shaft, this assembly comprising at least the bracket, a rotational speed sensor, and the pinion of the speed monitoring device.

10. A passenger transportation system configured as an escalator or moving walkway, the passenger transportation system comprising:

the speed monitoring device of claim 1, the tapping device of which being attached to a shaft casing surface of a main drive shaft of the passenger transportation system and an assembly, wherein the assembly comprises at least the bracket, the rotational speed sensor and the pinion of the speed monitoring device, and wherein the assembly is fixedly attached to a structural part of a supporting structure of the passenger transportation system, in which supporting structure the main drive shaft is also rotatably mounted.

11. The passenger transportation system of claim 10, wherein the speed monitoring device further comprises at least one of a control device or a signal transmission device to external data processing devices, and wherein signals generated by the rotational speed sensor are transmitted continuously or at discrete time intervals to the control device or the signal transmission device.

12. The passenger transportation system according to claim 11, further comprising a digital twin data record that virtually depicts the passenger transportation system, wherein the signals generated by the rotational speed sensor can be transmitted via the signal transmission device to the digital twin data record, and wherein, by processing these signals in connection with the data of the digital twin data record, dynamic processes of the passenger transportation system in operation can be simulated and displayed in real time by means of the digital twin data record.

13. A passenger transportation system configured as an escalator or moving walkway, the passenger transportation system comprising:

a speed monitoring device comprising:

at least one rotational speed sensor having an input shaft;

a tapping device configured such that it can be arranged on a shaft casing surface of a main drive shaft of the passenger transportation system, a rotational frequency of which is to be measured; and a bracket for fixedly attaching the rotational speed sensor relative to an axis of rotation of the tapping device, the speed monitoring device further comprising a pinion which is mechanically connected to the input shaft so that a rotation of the pinion is transmitted to the input shaft;

the tapping device having a gearing which can be coupled to the pinion in a rotation-transmitting manner; and the pinion being rotatably mounted in the bracket at two bearing areas;

wherein the tapping device of which is attached to a shaft casing surface of a main drive shaft of the passenger transportation system and an assembly, wherein the assembly comprises at least the bracket, the rotational speed sensor and the pinion of the speed monitoring device, wherein the assembly is fixedly attached to a structural part of a supporting structure of the passenger transportation system, in which supporting structure the main drive shaft is also rotatably mounted, wherein the speed monitoring device further comprises at least one of a control device or a signal transmission device to external data processing devices, and wherein signals generated by the rotational speed sensor are transmitted continuously or at discrete time intervals to the control device or the signal transmission device; and further comprising a digital twin data record that virtually depicts the passenger transportation system, wherein the signals generated by the rotational speed sensor can be transmitted via the signal transmission device to the digital twin data record, and wherein, by processing these signals in connection with the data of the digital twin data record, dynamic processes of the passenger transportation system in operation can be simulated and displayed in real time by means of the digital twin data record.

14. The passenger transportation system of claim 13, wherein the rotation-transmitting coupling is effected by direct engagement of the pinion in the gearing of the tapping device.

15. The passenger transportation system of claim 13, wherein the rotation-transmitting coupling between the pinion and the gearing is effected via a positive-locking transmission element.

16. The passenger transportation system of claim 13, wherein a torsionally rigid, flexible clutch is provided between the pinion and the input shaft.

17. The passenger transportation system of claim 13, wherein the tapping device comprises an annular, split adapter and wherein the gearing is arranged on an outer surface of the tapping device.

18. The passenger transportation system of claim 13, wherein the tapping device comprises an annular, split adapter and wherein the gearing is arranged on an inner surface of the tapping device.

19. The passenger transportation system of claim 13, wherein the bracket comprises at least two parts, wherein the rotational speed sensor is arranged on a first bracket part of the bracket and the pinion is rotatably mounted at the bearing areas, wherein a second bracket part of the bracket has an attachment region, which is provided for attaching the bracket to a fixed structural part of the passenger transportation system, and wherein the first bracket part and the second bracket part are adjustably connected to one another via a connection area.

20. The passenger transportation system of claim 13, further comprising a protective housing which can be attached to the bracket and the protective housing covers the pinion, the rotational speed sensor and the tapping device.

21. The passenger transportation system of claim 13, further comprising a protective housing which can be attached to the bracket and encloses the pinion, the rotational speed sensor and tapping device.

* * * * *